United States Patent [19]

Usui et al.

[11] 4,410,345
[45] Oct. 18, 1983

[54] METHOD OF PRODUCING OPTICAL WAVEGUIDE

[75] Inventors: Yuichi Usui, Yokohama; Shigeo Murai, Kyoto; Shiro Kurosaki, Nishinomiya; Minoru Watanabe, Yokohama, all of Japan

[73] Assignee: Sumitomo Electric Industries, Ltd., Osaka, Japan

[21] Appl. No.: 295,069

[22] Filed: Aug. 21, 1981

Related U.S. Application Data

[63] Continuation-in-part of Ser. No. 110,705, Jan. 9, 1980, abandoned.

[30] Foreign Application Priority Data

Jan. 11, 1979 [JP] Japan .................................. 54-2719
Feb. 1, 1979 [JP] Japan .................................. 54-11047

[51] Int. Cl.³ .......................................... C03C 25/02
[52] U.S. Cl. ........................................ 65/3.15; 65/31
[58] Field of Search .................... 65/3.11, 3.15, 13, 18, 65/31

[56] References Cited

U.S. PATENT DOCUMENTS

| 4,110,093 | 8/1978 | Macedo et al. | 65/3.15 |
| 4,110,096 | 8/1978 | Macedo et al. | 65/3.15 X |
| 4,188,198 | 2/1980 | Macedo et al. | 65/3.15 |
| 4,225,330 | 9/1980 | Kakuzen et al. | 65/31 X |
| 4,251,251 | 2/1981 | Blankenship | 65/18 X |
| 4,299,608 | 10/1981 | Macedo et al. | 65/3.1 |

Primary Examiner—Robert L. Lindsay, Jr.

[57] ABSTRACT

The present invention relates to a method of producing an optical waveguide by melt-drawing a transparent glass rod which has been produced by collapsing a doped porous glass rod. The glass rod is doped with refractive index enhancing dopant materials by depositing said material on the surface of the micro-pores wherein a waveguide having higher mechanical strength and lower transmission loss is obtained upon drawing said glass rod to a fiber. The drawing is performed at a temperature very close to the melting point of the outermost portion of the rod without causing any overmelting and resultant bubbling in the core portion. The drawing process is facilitated by matching the viscosity and softening characteristics of the outer, lower refractive-index portion of the rod to that of the central higher-refractive-index portion.

9 Claims, 5 Drawing Figures

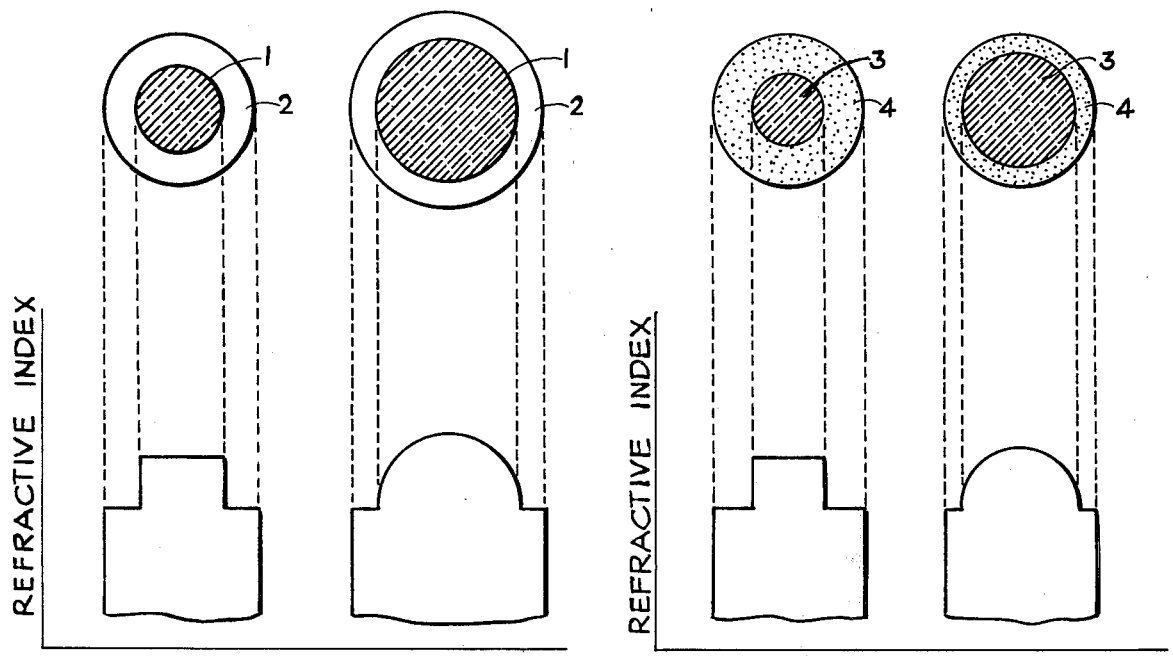
(PRIOR ART)
FIG.3
FIG.4
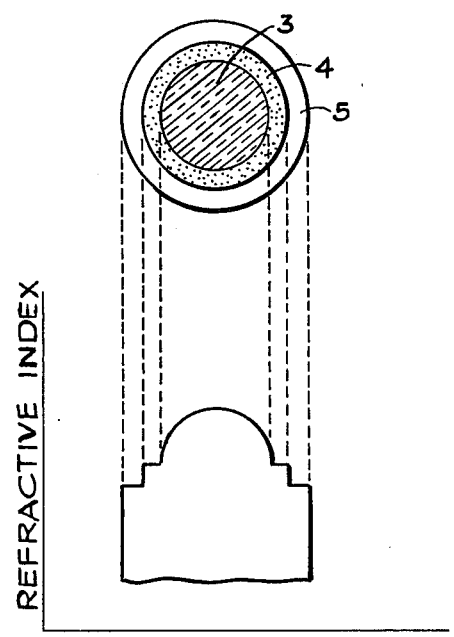
FIG. 5

METHOD OF PRODUCING OPTICAL WAVEGUIDE

RELATED APPLICATIONS

This application is a continuation-in-part of our U.S. Application, Ser. No. 110,705 filed Jan. 9, 1980 now abandoned.

FIELD OF THE INVENTION

The present invention relates to a method of producing a glass fiber for an optical waveguide and a preform drawing rod for this fiber.

BACKGROUND OF THE INVENTION

Among the qualities desired of an optical waveguide, mechanical strength as well as low transmission loss and low signal distortion are especially required. A number of manufacturing processes such as the M-CVD process, VAD process and molecular stuffing process are well known as methods for producing such fibers. Also the double crucible process and rod-in-tube process are also well known.

It is a general practice to apply a primary coating layer of thermally hardened resins such as silicone or epoxy-resins immediately after fiber drawing before contacting the same with any other substances for reinforcing and maintaining the initial mechanical strength of the fiber. In order to produce mechanically strong fibers, the surface of the drawing preform should be clean and smooth and the preform should be placed in a clean atmosphere when heated in a furnace. Apart from this, it is also required that the fiber be rapidly quenched immediately after the surface has been sufficiently smoothened by heat. Such a drawing condition is realized by making the longitudinal temperature gradient abrupt (a large, reduction ratio, is required for high temperature drawing). When the whole glass rod is softened and drawn into a fiber, the surface of the fiber is usually not smooth enough. $CO_2$-laser flame, and Joule or induction electric heaters of small diameter and height are examples of means for achieving these thermal drawing conditions.

The above thermal conditions are particularly required for the rod-in-tube process.

The present invention is based on the molecular stuffing process. Detailed information concerning the molecular stuffing process may be found in Japanese Patent Published Specifications No. 50-28339, 51-135915, 51-126207 and 53-102324, respectively equivalent to U.S. Pat. Nos. 3,938,974; 4,110,096; 4,110,093 and divisionals thereof U.S. Pat. Nos. 4,110,096; 4,183,620; 4,188,198; 4,229,608. These are referred to herein below as the "stuffing" patents. In such processes, a porous glass rod, which consists of $SiO_2$ and several percent of $B_2O_3$ produced by phase-separation, is used as the starting material. The above patents refer only to porous glass rods made by phase-separation; however, the invention also relates to and is applicable to the porous glass rods produced by half-sintering of CVD glass powders or by half-sintering of fine glass fibers.

In the prior art such as is disclosed in Japanese published specification (U.S. Pat. No. 4,110,093), a porous silicate glass including a small amount of $B_2O_3$ is doped with a dopant material in the manner described so that the dopant distribution produces a desired refractive-index distribution and gradient in the porous glass rod. The method is described in detail as follows:

The porous glass rod is immersed in an aqueous solution of a compound which will later be converted to an oxide dopant to enhance the refractive index of the glass. For example, an aqueous solution of $CsNO_3$, which decomposes at high temperature to $Cs_2O$, is stuffed in the pores of the rod, and the rod is then immersed in an alcoholic solution in order to reduce the temperature of the rod and/or the solubility of the compound, whereby the compound, such as $CsNO_3$ etc. is deposited or precipitated on the surface of micropores. The rod is then immersed in a solution so that the "stuffed" material that was deposited is gradually removed from the peripheral portions of the rod by dissolution whereby the concentration of the deposited material is varied according to desired radial gradient distribution. Then the rod is immersed in a solution in order to deposit the complete dopant in the micropores. The rod is then dried in a vacuum and the remaining solvent or water absorbed on the surface of the micro pores is removed by heating. As the temperature is raised further, the deposited compound $CsNO_3$ is decomposed to the dopant $Cs_2O$ according to reaction;

$$2CsNO_3 \rightarrow Cs_2O + N_2O_5.$$

The nitrogen oxide is a gas and diffuses away. The porous doped rod is then still further heated in a suitable atmosphere until the pores collapse, and a transparent glass preform, doped with dopant in a desired radial distribution gradient is obtained.

As described with respect to conventional practices, the core of the preform prepared in accordance with the conventional method consists of $Cs_2O$—$B_2O_3$—$SiO_2$ glass, containing a large amount of $Cs_2O$ and having a comparatively low melting point; and the cladding of such a preform consists of $B_2O_3$—$SiO_2$ glass which, by contrast, has a considerably high melting point. This is also the case with commercially available "Vycor" which is commercially used as an economical substitute for the porous pure silica glasses.

Optimally, the drawing temperature is at the softening point of the hard cladding glass when the preform is drawn alone or when it is inserted into a glass tube or pipe which usually has a lower softening temperature than the cladding portion. In other words, the drawing temperature of such preforms is high. However, the lower melting core glass softens so much at such high drawing temperatures that bubbling, believed due to due to decomposition of the glass oxide, takes place in the core and the fiber is subject to large diameter variation due to the bubbles, which obstruct the passage of the fiber through the die used for applying the resin, as described above. Such obstructing and discontinuities cause fracture of the fibers. Accordingly, it is difficult in conventional practice to produce optical waveguides in continuous lengths of high mechanical strength with smooth outer surfaces and quenched rapidly from high temperature.

It is necessary in the step-index type optical fiber for use as an optical waveguide that the refractive-index of the fiber core be higher than that of the outer cladding or jacket layer.

The refractive index of the glasses of pure $SiO_2$ or $SiO_2$ containing small quantities of $B_2O_3$ is lower than that of such $SiO_2$ glasses containing the refractive index increasing (Rii) dopants, such as $Cs_2O$.

In the case of employing such $SiO_2$ glasses as the basic materials for the core and the cladding layer, the cladding layer consists of substantially pure $SiO_2$ and the Rii-dopant has been added to the core, to raise the refractive-index of the $SiO_2$ for the formation of the predetermined refractive-index distribution.

The preforms of the prior art "stuffing" patents belong to the above-mentioned type. Namely, a Rii-dopant is stuffed in a porous glass rod to raise the refractive-index of the porous rod and this forms the glass rod for the core by the molecular stuffing method. The glass rod is subsequently inserted into a $SiO_2$ tube or pipe and they are heat collapsed into an integrated unit assembly of transparent glass rod as a preform. The tubing is made of pure $SiO_2$ or $SiO_2$ containing several percent of $B_2O_3$ for slightly decreasing the refractive-index of the glass.

In the preforms of the "stuffing" patents, the cores contain from several to some ten percent of the Rii-dopant to raise the refractive-index. Such large amounts of the Rii-dopant decreases the melting temperature of the core. On the other hand, the cladding layer, which is made of pure $SiO_2$ or $SiO_2$ containing a small quantity of $B_2O_3$, has therefore a higher melting temperature. To permit the drawing, the cladding layer must be heated to a temperature sufficiently higher than that needed for the core in order to decrease the viscosity of the cladding layer when the preform is drawn to a fiber. An optical fiber having high mechanical strength thus can not be obtained either because of insufficient melting of the cladding layer in the case of drawing at temperatures merely sufficient to melt the core; or if the drawing temperature of the preform is matched to the softing temperature of the hard cladding glass, the core glass is softened so much at such high temperature that bubbling takes place in the core.

BRIEF DESCRIPTION OF THE DRAWING

FIGS. 3–5 are sections through the fibers of this invention and the prior art showing the refractive index profiles of such sections.

THE INVENTION

Figure 1:
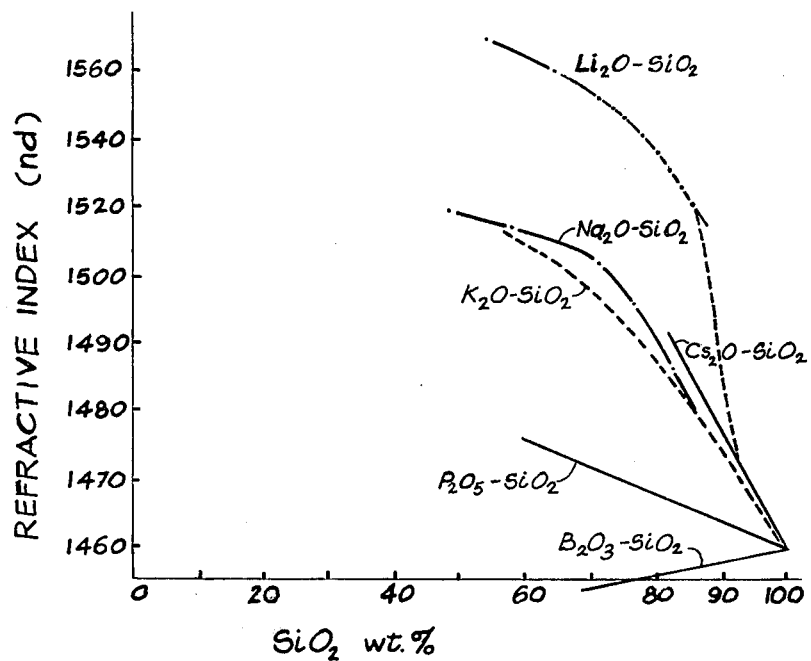
FIG. 1 is a diagram showing the dependence of the refractive index of $SiO_2$-glasses on the amount of various metal oxide dopants.

In the present invention, a special viscosity reducing (V-R) dopant is added to the cladding layer or jacket to decrease its viscosity until it matches that of the core glass without affecting the refractive-index of the cladding layer when the preform is heated to drawing temperature.

In this invention, the clad layer can be melted at the comparatively low temperatures-matched to that of the core glass and the fiber and the surface is made smooth by adding the special V-R dopant which decreases the viscosity of the cladding.

The optical fiber having high mechanical strength is thus obtained, when the preform, according to this invention, is drawn to the optical fiber.

As a result of the present invention, heating of the core to such a high temperature as to cause danger of the occurrence of the bubbles in the core with resultant increase of transmission light losses caused by such bubbles and also the resulting strains in the core can be avoided.

It is an object of the present invention to provide a method for producing an optical waveguide of high mechanical strength and free from optical discontinuities by stuffing a V-R dopant, for reducing the viscosity of the glass, into a porous glass rod, whereby the viscosity and coefficient of thermal expansion of the central glass having the increased refractive index and that of the surrounding glass having reduced refractive index are matched to each other. Another object of the present invention is to provide a method for preparing a preform which has a soft cladding and has a uniform high-temperature viscosity through the cross-section thereof. The method of the present invention consists of matching the viscosity of the cladding with that of the core and the jacket by lowering the high-temperature viscosity of the cladding by doping the cladding glass portion of the preform with a V-R dopant material which softens or reduces the high temperature viscosity of the glass. Dopants, such as the oxides of Cs, Rb, Pb, Ba, Al, Na, Nd, B and K are used in the art in varying amounts for controlling the refractive index. A dopant for lowering the viscosity should not have much influence on the refractive index of the cladding glass. The compounds such as $P_2O_5$ or $B_2O_3$ are suitable for use as dopants for viscosity reduction, because they are stable oxides having low melting points and are obtainable by oxidizing compounds which are soluble in water or alcohol and are thus suitable for stuffing and similar deposition. Compounds such as $Li_2O$, $Na_2O$, $K_2O$, MgO or CaO have a slight tendency to enhance the refractive index but have a much greater tendency to reduce the viscosity even in small amounts and thus can also be used as V-R dopants.

DETAILED DESCRIPTION OF THE INVENTION

The present invention will be described in more detail in the following, which outlines a preferred mode and variants thereon. A $SiO_2$-porous glass, containing several percent of $B_2O_3$, prepared by phase-separation and leaching processes, or porous glass prepared by semi-sintering $SiO_2$-glass powder obtained by flame hydrolysis, is immersed in a solution of Rii-stuffing agent compound for controlling the refractive index. The glass is subsequently immersed in a poorer solvent or precipitant solution for the compound in order for the Rii-stuffing compound to deposit on the pore walls. The glass is then immersed in a liquid such as water, alcohol or a water-alcohol system, whose temperature has been adjusted so that the precipitated compound has a predetermined solubility in the "unstuffing" solvent.

The stuffing compound, still dissolved in the solution in the pores or deposited on the pore wall, starts leaching or dissolving out of rod during this process. The rate of leaching is controlled by the pre-determined solubility. It is most rapid at the outer surface of the rod.

If this "unstuffing" liquid contains a proper amount of a V-R stuffing dopant material for viscosity adjustment, the unstuffing process removes, by diffusion, only the Rii-stuffing agent for refractive-index adjustment, and the Rii-stuffing agent for refractive-index adjustment, and the V-R stuffing agent for viscosity control remains in the pores. After having obtained a proper distribution of the stuffing materials, the porous glass is immersed in a poor solvent for the stuffing material for refractive-index adjustment or a poor solvent for the stuffing materials for both refractive-index and viscosity adjustment, in order to make the material still in place deposit on the pore wall. After this, the rod is subjected to the conventional sequence of processing, including vacuum drying, heating, decomposition of the stuffed compounds to form the dopant oxides and collapsing the pores to produce a transparent preform, the cladding portion of which has a low viscosity at the drawing temperature matched to duplicate or approximate that of the core material.

The stuffing material to be used as a Rii-dopant for refractive-index adjustment may be, for example, $CsNO_3$ or the others which are described in the "stuffing" patents mentioned above. The V-R stuffing materials for adjusting the viscosity may be boron compounds such as $H_3BO_3$, $NH_4HB_4O_7$, $Na_2B_4O_7$, $K_2B_4O_7$ or $Li_2B_4O_7$ or phosphorus compounds such as $H_3PO_4$, $(NH_4)_3PO_4$, $(NH_4)_2HPO_4$, $(NH_4)H_2PO_4$, $K_3PO_4$, $K_2HPO_4$, $KH_2PO_4$, $Na_3PO_4$, $Na_2HPO_4$, $NaH_2PO_4$, $LiH_2PO_4$, $Li_2HPO_4$ or $Li_3PO_4$, which all dissolve in water, alcohol or water-alcohol systems. The V-R stuffing material should preferably be chosen with regard to its solubility in the unstuffing solvent to be used. For example, if a concentrated aqueous solution of $C_2H_5OH$ is to be used as the unstuffing solvent, suitable stuffing compounds may be $H_3BO_3$ or $H_3PO_4$, and the suitable solution for final deposition of these compound, in this case may be organic liquids such as $C_2H_5OH$, $C_3H_7OH$, alcohol or acetone.

Another method of stuffing for viscosity adjustment is to add the V-R compound to the solution in which the porous glass is immersed for final deposition after the Rii-material for refractive-index adjustment has been stuffed, deposited, and unstuffed. For example, if $C_2H_5OH$ is used for the final solution, the stuffing material to be used in this method will be limited only to a few materials such as $H_3PO_4$, and $H_3BO_3$. The rod is then subjected to the conventional process sequence of vacuum drying, heating, decomposition and the collapsing of the porous stuffed rod to yield the transparent preform which is one feature of this invention.

If necessary, a method may be employed in which the Rii-material used for refractive-index adjustment is deposited by a stuffing solution also used as a vehicle for viscosity control compounds and then the rod is immersed again in a poor solvent for the viscosity control agent in order to deposit both materials. This method has an advantage that the material for viscosity control is fixed on the pore wall and does not migrate during the vacuum drying process when often the solution moves outwards. A uniform distribution of the V-R-viscosity control dopant is obtained.

A further method for stuffing the dopants for viscosity control is as follows:

The glass is subjected to the conventional sequence of stuffing, first deposition, unstuffing and second deposition of the Rii-refractive index material. Then, the glass rod is immersed in a solution of a V-R viscosity-control agent which solution has no solving power for the Rii-compound. An example of such solvent is $C_2H_5OH$. After the V-R viscosity-control agent has been stuffed, the glass rod is immersed in a poor solvent for this agent, such as acetone to precipitate this material. It is then subjected to vacuum drying, heating, decomposition and collapsing processes.

A still further method is one in which the glass rod is stuffed, at the same time, with both agents, one for adjusting viscosity and one for adjusting the refractive index, and then the Rii-material is unstuffed by a selective solvent which has no solvent power for the V-R agent.

The methods described above can be repeated several times to obtain a preselected refractive-index gradient or distribution, taking into account the solubility and diffusion rate of both types of stuffing agents. The above-mentioned methods are described more specifically in Examples 2 and 3.

Compounds of Li, Na, K, Mg, Ca P and B such as $LiNO_3$, $NaNO_3$, $KNO_3$, $MgSO_4$, $Ca(NO_3)_2$, $H_3BO_3$ and $H_3PO_4$ dissolve in pure water, water-methanol systems or pure methanol and small amounts of such compounds can be used as V-R-stuffing agents for controlling the viscosity of glasses. The effect of dopants on refractive index of silicate glasses, doped with such materials in commonly used amounts is shown in FIG. 1.

According to FIG. 1, the refractive-index increments in silicate glasses doped with, respectively, 2.5 wt% $Li_2O$, 5 wt.% $Na_2O$ and 5 wt.% $K_2O$ are less than 0.010, 0.0075 and 0.0075. When 15 wt.% $P_2O_3$ or 15 wt % $B_2O_3$ is doped, the refractive-index of the glasses increases less than 0.005, or even decreases.

Figure 2:
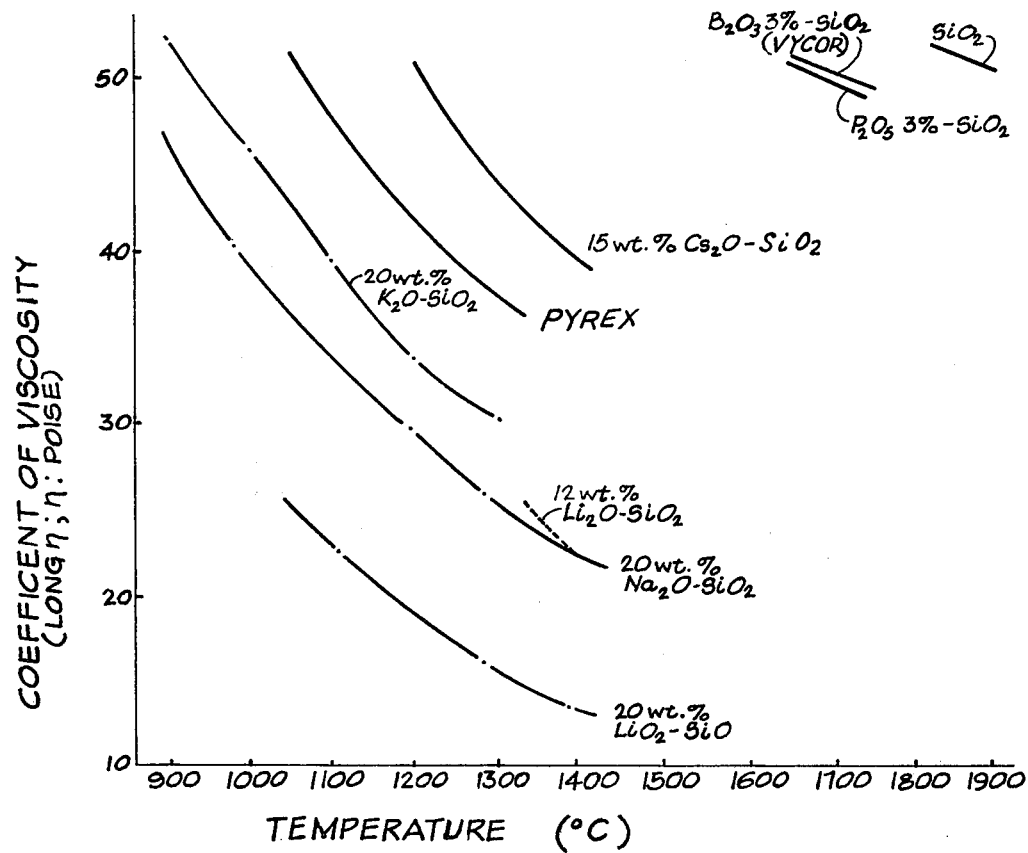
FIG. 2 is a diagram showing the dependence of the viscosity of $SiO_2$-glasses on the amount of various metal oxide dopants and of the glasses themselves.

FIG. 2 shows the viscosity change of silicate glasses doped with 20 wt % of $Li_2O$, $N_2O$, $K_2O$ dopants. From this diagram, one may safely infer that the glasses become soft enough when the dopant concentration is no more than 5 wt %. An example of such stuffing agents is shown in Example 3.

As seen in FIG. 2, as the percentage of the V-R dopants $B_2O_3$ or $P_2O_5$ increases above 3 wt %, the coefficient of viscosity of the $B_2O_3$-$SiO_2$ glass or $P_2O_5$-$SiO_2$ glass approaches that of 15 wt % $Cs_2O$-$SiO_2$ glass. At about 20% concentration of the dopants $Li_2O$, $Na_2O$ or $K_2O$, the coefficient of viscosity of $Li_2O$-$SiO_2$ glass, $Na_2O$-$SiO_2$ glass or $K_2O$-$SiO_2$ glass approaches or matches that of 15 wt % $Cs_2O$-$SiO_2$ glass, the core glass composition.

The glass comprising of 15 wt.% $Cs_2O$-$SiO_2$ is preferred for the core portion of the fiber. According to the above disclosure, the coefficient of viscosity of the cladding portion of the glass can be matched to those of the core portion of the glass by controlling the introduction and the content of the V-R dopants in the cladding portion.

The thermal expansion of the core and cladding portions have been observed to match when the viscosities of these glasses, at or about the drawing temperatures matches.

FIG. 2 also includes, as a frame of reference, the viscosity data for $SiO_2$, Vycor, Pyrex and the doped core glasses.

The porous glass starting material which is doped according to this invention is a silica glass, being either pure silica or a silica.boron glass such as commercially marketed silica glass under the Vycor trademark and containing about 3% Boron.

The preferred stuffed dopants for increasing the index of refraction of the core portion is $Cs_2O$ and is introduced into the core portion in final graded concentrations of up to 30 wt.%. The concentration of $Cs_2O$ decreases from the central core to the cladding portion where ideally it is absent, being removed by the unstuffing steps. These concentrations and their distribution are well-known and described in the aforementioned "stuffing" patents.

The section and resulting profiles of the indices of refraction of the prior art fibers and the fibers according to this invention is shown in FIGS. 3–5. In FIG. 3, the prior art, core 1 of high refractive index is shown surrounded by lower refractive index cladding 2. FIG. 4 shows a similar section and profile of a fiber of this invention with core 3 surrounded by cladding 4, which latter contains the V-R dopants.

The V-R dopants for reducing the viscosity at drawing temperatures of the cladding glass is the oxide or oxide precursor compounds of phosphorous, boron, alkali metals and alkaline earths. The general range of boron oxide concentration for matching the viscosity of the cladding to that of the core, ranges from about 5 to about 15 wt.% of $B_2O_3$. The amount is varied to match the viscosity at draw-temperature of the composition of the core glass. The 15% $B_2O_3$ concentration approximately matches that of core glass containing about 15% $Cs_2O$. The phosphorous oxides similarly are used at concentrations of $P_2O_5$ ranging from about 10 wt% to about 2 wt.%. The alkali metal and alkaline earth oxides are similarly used at concentrations ranging from about 7.5 wt% to about 1 wt%. Since the preferred $Cs_2O$ concentrations are at the higher limits of the stated range, the higher limits of the V-R dopants is preferred. Minor adjustments of concentration of both dopants may be made depending upon the specific glass compositions, and the specific dopants used, provided that the standard of matching of the viscosities at drawing temperatures of the cladding to the core is met.

In this way, the present invention allows the preform to be melt-drawn in a sharp temperature gradient at a temperature at which no bubbling takes place in the core, by reducing the drawing-temperature viscosity of the cladding portion down to the viscosity of the core and jacket portions. Hence, the outermost glass layer (cladding layer in the case of *direct drawing* of only the preform; and jacket layer in the case of drawing the rod-in-the-tube is maintained clean and smooth during the drawing and just before applying the resin coating. Optical waveguides having extremely high mechanical strength are then obtained by applying the primary resin coating immediately after drawing and before the fiber surface may be exposed to any contamination.

Apart from the rod-in-tube sequence drawing method, the preform may be drawn after an integrated combination of rod and tube has been assembled by collapsing the pyrex tube into which the rod, in porous or transparent state, is inserted. This is possible because the viscosity of the cladding layer has been reduced to near that of the jacket layer.

Since all the portions of the preform, in accordance with the present invention, have similar viscosity and coefficient of thermal expansion, the preform can be drawn very smoothly to form an optical fiber free from structural imperfections and having minimal light transmission losses.

EXAMPLE 1

An $Na_2O-K_2O-B_2O_3-SiO_2$ glass was prepared by fusing the powders of 40% $SiO_2$, 48% $H_3BO_3$, 5% $K_2CO_2$ and 7% $Na_2CO_3$ and formed into a glass rod of 10 mm in diameter. The rod was heat-treated at 540° C. for 15 hours, leached at 100° C. in 3 N HCl solution and then rinsed with pure water. The porous glass thus obtained had a 50% porosity. The rod was then stuffed in 67% $CsNO_3$ aqueous solution at 100° C.; the stuffed $CsNO_3$ was deposited by pure water at a temperature of 20° C.; gradiently unstuffed in $C_2H_5OH$ 80%-$H_2O$ 20% solution for 24 hours. Then the rod was immersed in a saturated acetic acid solution of $H_3BO_3$ for the precipitation of the residual $CsNO_3$ and, at the same time, the stuffing of the $H_3BO_3$ in the pores. The rod was finally immersed in $(CH_3)_2CO$ for 12 hours to ensure precipitation and deposition of both the $H_3BO_3$ as well as $CsNO_3$. The rod was subsequently dried slowly in a vacuum at a temperature range of 0°–20° C. and then heated to decompose both $H_3BO_3$ and $CsNO_3$ by the reactions:

$$2H_3BO_3 \rightarrow B_2O_3 + 2H_2O \text{ and}$$
$$2CsNO_3 \rightarrow Cs_2O + N_2O_5.$$

After that, the rod was further heated until the pores collapsed and the rod became transparent. This is preform A with a diameter of about 8 mm. A preform B was also prepared exactly in the same way as Preform A except that the $CsNO_3$ was deposited in pure $C_2H_5OH$ which contained no $H_3BO_3$.

These preforms were cleaned on the surface with 5% HF aqueous solution, melt-drawn by heating, using a carbon heater 20 mm high and 20 mm in inner diameter, and then quenched and coated with a primary coating on the surface thereof. The fibers thus obtained had a diameter of 150 μm. The drawing temperature needed for preform B was over 1500° C. and the resultant B fiber sometimes fractured during drawing owing to irregularities. The minimum strength of the B fiber thus produced was about 1.0 kg per fiber. The drawing temperature of preform A was under 1300° C. and the minimum strength of the fiber was 3.5 kg per fiber. This was considerably higher than that of the prior art comparison B Fiber.

EXAMPLE 2

A porous glass rod, prepared and stuffed with $CsNO_3$ in the same way as in Example 1, was deposited of $CsNO_3$ in pure water at 4° C., unstuffed in a aqueous solution of $H_3PO_4$ at 4° C. for 4 hours and then immersed in $C_3H_8OH$ at a temperature of 20° C. for depositing both $CsNO_3$ and $H_3PO_4$ still remaining dissolved in the solution. The rod was subsequently subjected to the processes of vacuum drying, heating, decomposition and collapsing. The preform thus obtained was denoted as preform C.

Preform D was prepared exactly in the same way as preform C except that the unstuffing was performed in pure water which did not contain any $H_3PO_4$. The collapsed transparent rods were treated in the same way as in Example 1 and inserted into Pyrex tubing 8 mm in inner diameter and 12 mm in outer diameter which has been rinsed with 5% HF aqueous solution. The combination assembly of the rod-in-the-tube was melt-drawn under a reduced pressure to fibers. The fibers drawn were immediately coated with a primary polymer coating on the outer surface. The drawing temperature of the preform D was over 1500° C. The D fibers obtained, sometimes fractured during drawing due to observed bubbles. The minimum strength of the fiber D was found to be 1.5 kg per fiber.

The drawing temperature of the preform C was below 1300° C. and the minimum mechanical strength of the fiber obtained was 4.0 kg per fiber which was considerably higher than that of fiber D representing the prior art.

EXAMPLE 3

An $Na_2O$-$K_2O$-$B_2O_3$ glass was prepared by mixing and fusing powders of 40% $SiO_2$, 48% $H_3BO_3$, 5% $K_2CO_3$ and 7% $Na_2CO_3$, and a rod of 10 mm in diameter was formed out of the glass. The glass rod was heat-treated at 540° C. for 15 hours, leached in 3 N HCl aqueous solution at 100° C. and then rinsed with pure water. The porous glass rod thus prepared had a porosity of 50%. The rod was subsequently immersed for stuffing in a 67% $CsNO_3$ aqueous solution at 100° C. and then deposited of $CsNO_3$ in the pores by pure water at a temperature of 20° C. Five sets of preforms A to E were prepared by carrying out the unstuffing process for five hours in five different solutions; 48.5 g $LiNO_3$/100 cc water (preform A), 28.9 g $NaNO_3$/100 cc water (preform B), 22.6 $KNO_3$/100 cc water (preform C) 93.6 gm $Ca(NO_3)_2,4H_2O$/100 cc water (preform D) and 64.4 g $MgSO_4\,7H_2O$/100 cc water (preform E). All the unstuffing solutions were kept at 20° C. during the unstuffing. Each rod was subsequently immersed in $C_2H_5OH$ at 20° C. so that the V-R stuffing compounds for viscosity control, i.e., $LiNO_3$, $NaNO_3$, $KNO_3$, $Ca(NO_3)_2$ and $MgSO_4$, were deposited on the pore wall together with Rii-refractive-index agent, $CsNO_3$. Duplicate sets of transparent preforms A to E which were 8 mm in diameter were obtained after the conventional treatments-vacuum drying at 20° C., decomposition by heating, and further heating to 850° C. for collapsing the pores. Two additional duplicate preforms F and G were also prepared. The preforms F were unstuffed by treating the rod doped with $CsNO_3$ in pure water at 20° C. for 2 hours and the preform G was unstuffed by treating said rod in a mixture of $C_3H_5OH$ 80%+$H_2O$ 20° C. for 24 hours.

One set of these preforms were rinsed on the surface with 5% HF aqueous solution and then drawn by heating with a carbon heater 20 mm in inner diameter and 20 mm high. The quenched fiber was coated with a primary coating immediately after drawing and then a nylon coating was formed thereon by extrusion.

Another group of preforms A to G were inserted into Pyrex tubes 8 mm I.D. and 12 mm O.D. after being rinsed with a HF-$H_2SO_4$ mixture, and the preforms-in-tubes were drawn under reduced pressure, quenched, coated with a primary coating and then coated with nylon. The mechanical strength of the fibers stuffed with the different V-R agents are compared in Table 1.

Preforms F and G, particularly preform G, fractured during the drawing owing to the observed bubbles; however, preforms A to E could be drawn at much lower temperatures so that there was no bubbling during drawing.

The transmission losses of the two kinds of fibers, directly drawn and rod-in-tube drawn, were compared. With respect to the fibers drawn from preforms C and F: the transmission losses in the fibers directly drawn and rod-in-tube drawn from the preform C were 15 dB/km and 14 dB/km respectively for a wavelength $\lambda=0.85$ μm and 6 dB/km and 3 dB/km respectively for a wavelength $\lambda=1.05$ μm.

With respect to the preform F, the fiber directly drawn and rod-in-tube drawn had absorption losses of 30 dB/km and 19 dB/km respectively for a wavelength $\lambda=1.05$ μm.

It is seen from Table 1 (below) the fibers produced in accordance with the present invention, by both direct drawing and rod-in-tube drawing, have greater mechanical strength than the fibers produced by the conventional prior art methods where stuffing and unstuffing were practiced only with Rii-(refractive index increasing) dopants.

TABLE 1

| Minimum Mechanical Strength of Coated Fibers (Kgw/fiber) | | | | | | | |
|---|---|---|---|---|---|---|---|
| Preform | A | B | C | D | E | F | G |
| Directly drawn | 3.3 | 3.5 | 3.6 | 3.2 | 3.0 | 1.5 | 1.0 |
| Rod-in-tube drawn | 3.0 | 4.0 | 3.8 | 3.5 | 3.4 | 2.3 | 1.5 |

We claim:

1. A method of producing an optical wave guide comprising an optical fiber by the drawing of a doped, transparent, glass rod to form said fiber which comprises the steps of preparing said doped, glass rod by stuffing a porous glass rod with two classes of dopant materials, refractive index increasing (Rii) dopant materials and viscosity reducing (V-R) dopant materials; unstuffing the refractive index dopant materials from at least the outer portions of the porous rod by solvent diffusion to form a cladding portion of lower refractive index around a high refractive index core portion; maintaining the viscosity-reducing dopant materials, at least at said outer cladding portion, at a concentration sufficient to provide dopants which reduce the viscosity of the cladding at drawing temperatures to approach and match the viscosity of the high-refractive index core, said viscosity-reducing dopant materials being selected from the group of water-soluble compounds consisting of the elements which form glass viscosity-reducing oxides selected from the group consisting of oxides of P,B,Li,Na,K,Mg and Ca, said refractive index-increasing dopant materials being selected from the group consisting of water-soluble compounds and mixtures thereof of Cs, Rb, Pb, Ba, Al, Na, Nd, B and K which upon heating, form refractive-index-increasing oxides for glass; heating said so-diffused rods to convert said dopant materials to dopants to form said doped, transparent glass rods; and drawing the doped transparent rod to a fiber.

2. The method according to claim 1, wherein both said dopant materials simultaneously stuffed to said porous glass rod.

3. The method according to claim 1, wherein both said dopant materials are separately stuffed to said porous glass rod.

4. The method according to claim 1, wherein the boron and phosphorous viscosity-reducing dopant materials are soluble in water, alcohol and water-alcohol systems.

5. The method according to claim 1, wherein the porous glass rod is stuffed with a refractive-index-increasing dopant material by treating the rod with hot aqueous solution of $CsNO_3$, depositing said compound on the pore walls by immersing the rod in a solvent selected from the group consisting of water, alcohol and mixtures thereof at substantially room temperature, and unstuffed by treatment with one of said solvents in the presence of a viscosity-reducing dopant material and depositing said dopants in the porous glass rod by heating to form the dopants.

6. The method according to claim 1, wherein the porous glass rod is stuffed with a refractive index-increasing dopant by treating the same with a hot aqueous solution of $CsNO_3$, and unstuffing said dopant material by immersing the rod in a solvent selected from the group consisting of water, alcohol and mixtures thereof at substantially room temperature, and then further stuffing by immersion in a solution of a viscosity-reducing dopant material in the presence of one of the aforesaid solvents and depositing the dopant on the pores of said rod by heating to form the dopants.

7. The method according to claim 9, wherein the viscosity-reducing dopant is selected from the group consisting of phosphoric and boric acids and phosphoric and boric oxide precursors and mixtures thereof.

8. The method according to claim 1, wherein the porous glass rod is stuffed with a refractive-index-increasing dopant therefor, by treating the same with a hot aqueous solution of $CsNO_3$, depositing said compound in the pores of the rod by immersing the rod in a solvent selected from the group consisting of water, alcohol, and mixtures thereof, unstuffing said compound by leaching the rod in said solvent in the presence of a viscosity-reducing dopant material said viscosity-reducing dopant material being selected from the group consisting of the boric acid and nitric acid salts of lithium, potassium and sodium, and depositing both dopant materials in the pores of the rod by immersing the rod in alcohol.

9. The method according to claim 1, wherein the glass rod is inserted into glass tubing comprising a glass selected from among borosilicate and alumino-borosilicate glasses and the assembled rod in tube structure thus formed is melt drawn to a fiber, having core and cladding of matched viscosities.

* * * * *